US00H002289H

(19) United States
(12) Statutory Invention Registration
Kennedy

(10) Reg. No.: US H2289 H
(43) Published: Feb. 4, 2014

(54) ACTUATOR PIVOT SHAFT ROLLING BEARING WITH SEAL

(71) Applicant: Donald Michael Kennedy, Asheville, NC (US)

(72) Inventor: Donald Michael Kennedy, Asheville, NC (US)

(73) Assignee: BorgWarner Inc., Auburn Hills, MI (US)

(21) Appl. No.: 13/768,029

(22) Filed: Feb. 15, 2013

(51) Int. Cl.
*F01D 25/16* (2006.01)

(52) U.S. Cl.
CPC ..... *F01D 25/16* (2013.01)
USPC ..... 384/481

(58) Field of Classification Search
USPC ..... 384/481
See application file for complete search history.

(56) References Cited

U.S. PATENT DOCUMENTS

2006/0156846 A1* 7/2006 Neubauer et al. ..... 74/425
2012/0036849 A1* 2/2012 Watson et al. ..... 60/611

* cited by examiner

*Primary Examiner* — Daniel Pihulic

(57) ABSTRACT

A variable turbine geometry turbocharger with an actuator pivot shaft with a rolling-element bearing having a rolling element between an inner race and outer race. Replacing a standard actuator shaft bushing with a rolling-element bearing may reduce friction and adverse movement in certain applications. Various seals may be feasible, such as a face seal attached to the inner or outer bearing race that could seal against the opposing race.

1 Claim, 1 Drawing Sheet

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

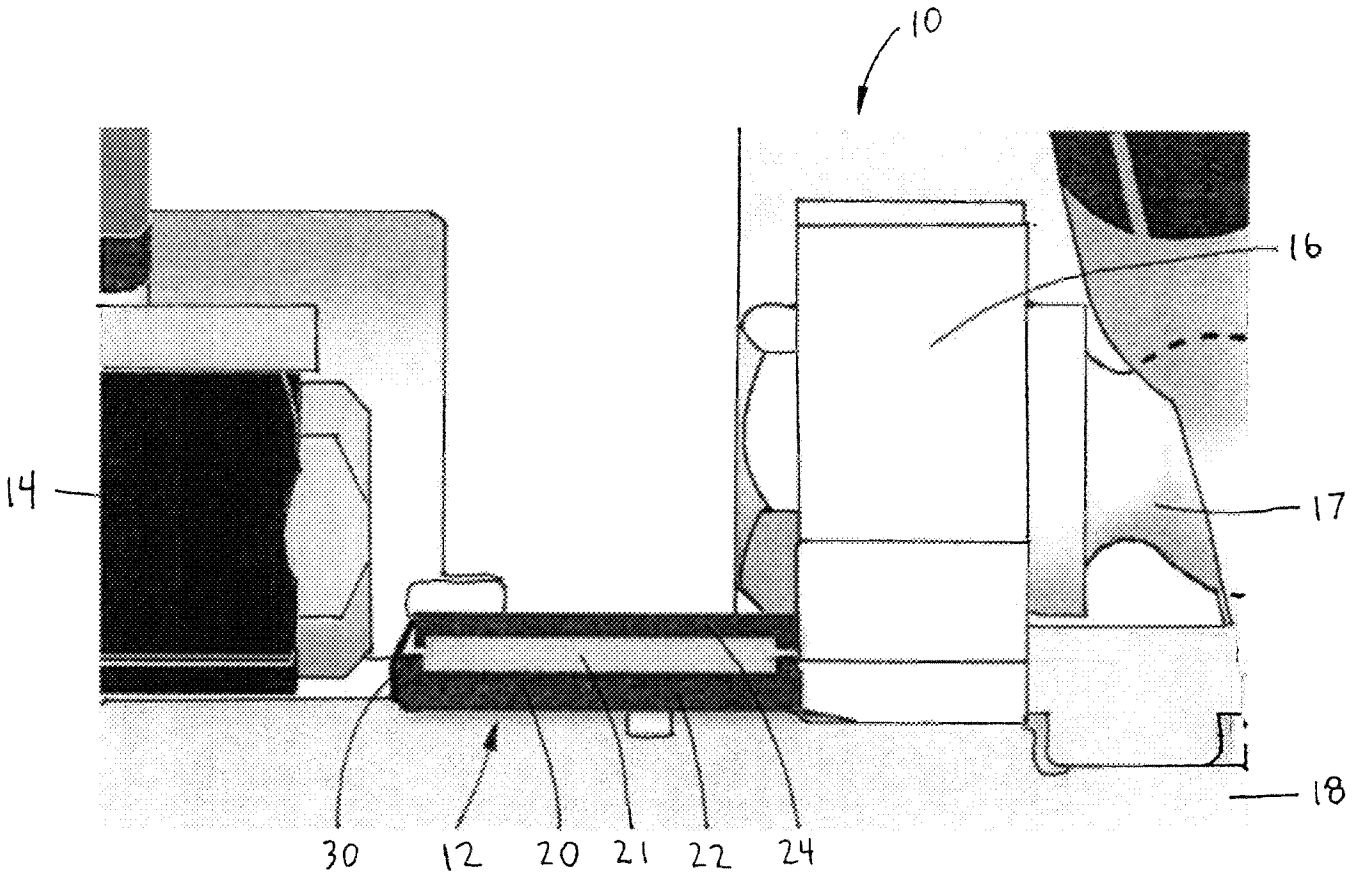
10
19
17
18
24
22
21
20
12
30
14

ACTUATOR PIVOT SHAFT ROLLING BEARING WITH SEAL

BACKGROUND

1. Field of the Disclosure

This disclosure relates to turbochargers with variable turbine geometry with an actuator pivot shaft. Specifically, this disclosure relates to replacing a standard actuator shaft bushing with a rolling-element bearing.

2. Description of Related Art

Advantages of turbocharging include increased power output, lower fuel consumption and reduced pollutant emissions. The turbocharging of engines is no longer primarily seen from a high-power performance perspective, but is rather viewed as a means of reducing fuel consumption and environmental pollution on account of lower carbon dioxide ($CO_2$) emissions. Currently, a primary reason for turbocharging is using exhaust gas energy to reduce fuel consumption and emissions. In turbocharged engines, combustion air is pre-compressed before being supplied to the engine. The engine aspirates the same volume of air-fuel mixture as a naturally aspirated engine, but due to the higher pressure, thus higher density, more air and fuel mass is supplied into a combustion chamber in a controlled manner. Consequently, more fuel can be burned, so that the engine's power output increases relative to the speed and swept volume.

In exhaust gas turbocharging, some of the exhaust gas energy, which would normally be wasted, is used to drive a turbine. The turbine includes a turbine wheel that is mounted on a shaft and is rotatably driven by exhaust gas flow. The turbocharger returns some of this normally wasted exhaust gas energy back into the engine, contributing to the engine's efficiency and saving fuel. A compressor, which is driven by the turbine, draws in filtered ambient air, compresses it, and then supplies it to the engine. The compressor includes a compressor impeller that is mounted on the same shaft so that rotation of the turbine wheel causes rotation of the compressor impeller.

Turbochargers typically include a turbine housing connected to the engine's exhaust manifold, a compressor housing connected to the engine's intake manifold, and a center bearing housing coupling the turbine and compressor housings together. The turbine housing defines a volute that surrounds the turbine wheel and that receives exhaust gas from the engine. The turbine wheel in the turbine housing is rotatably driven by an inflow of exhaust gas supplied from the exhaust manifold.

A variable turbine geometry (VTG) turbocharger allows a turbine flow cross-section leading to the turbine wheel to be varied in accordance with engine operating points. This allows the entire exhaust gas energy to be utilized and the turbine flow cross-section to be set optimally for each operating point. As a result, the efficiency of the turbocharger and hence that of the engine can be higher than that achieved with bypass control of a wastegate valve assembly. Variable guide vanes in the turbine have an effect on pressure build-up behavior and, therefore, on the turbocharger power output.

A VTG pivot shaft is typically not fitted directly to a bore in the turbine housing, but more often to a stationary bearing in a bore in the turbine housing. The pivot shaft is often radially located in a bearing, which can be located either in a bore, with a centerline within the turbine housing, or directly in the bearing housing depending on the design.

Borg Warner's US 2011/037639 for a "Control Shaft Seal" discloses a method for keeping an "actuator pivot shaft" concentric in its bore to enhance the sealing capability thus maximizing the retention of the exhaust gases within the turbocharger and minimizing the escape of exhaust gases to the environment external to the turbocharger.

Other VTG actuator pivot shafts can experience significant wear in certain applications during operation, presumably from high pressure loading between the bushing and shaft near the fork end of the shaft (turbine side). Lack of lubrication can cause high friction forces between the shaft and bearing components, reducing available VTG actuation torque. Furthermore, in certain operations, it may be difficult to seal the shaft to the bearing housing because of clearance between the shaft and bushing and the associated misalignment of the shaft to the bushing/housing.

This disclosure focuses on a rolling-element bearing for a VTG actuator pivot shaft, and forces and movement between the shaft and bearing components.

SUMMARY

An actuator pivot shaft bearing assembly may have a rolling-element bearing with a rolling element between an outer race and an inner race with a face seal, which can operate adjacent to the VTG lever. A rolling-element bearing can replace standard actuator shaft bushing.

The rolling-element bearing is a bearing that carries a load by placing round rolling elements between bearing rings/races. The relative motion of the pieces causes the round elements to roll with little rolling resistance and with little sliding.

The rolling-element bearing might reduce friction and could be designed for minimal axial and radial movement. This could allow for various types of seals, such as a face seal that is attached to the inner or outer bearing race and could seal against the opposing race. The axial location and surface finish between the two races could be tightly controlled.

BRIEF DESCRIPTION OF THE DRAWING

Advantages of the present disclosure will be readily appreciated as the same becomes better understood by reference to the following detailed description when considered in connection with the accompanying drawing wherein FIG. 1 is a cross-sectional view of a turbocharger's actuator pivot shaft bearing assembly with rolling-element bearing with a rolling element between an outer race and an inner race with a face seal.

DETAILED DESCRIPTION OF THE EMBODIMENTS

A turbocharger is generally known and includes a turbine and a compressor, wherein a compressor impeller is rotatably driven via a rotating shaft by a turbine wheel. The rotating shaft passes through a bearing housing between a turbine housing and a compressor housing.

The variable turbine geometry (VTG) turbocharger 10 may include an actuator pivot shaft assembly 12 as shown in FIG. 1 with a portion between a large block 14 and a VTG lever 16 with a ball 17 on the VTG lever 16. The actuator pivot shaft 18 defines an axis of rotation partially surrounded by a rolling-element bearing 20.

The VTG turbocharger 10 may include an actuator pivot shaft bearing assembly 12 with a rolling-element bearing 20 with a rolling element 21 between an inner race 22 and outer race 24. The inner race 22 is closest to the actuator pivot shaft 18 with a smaller circumference than the outer race 24. The rolling elements 21 used in rolling-element bearings 20 is shown in the figure as a cylindrical roller, but balls, tapered rollers, spherical rollers, and needles are known rolling elements. A particularly common kind of rolling-element bearing 20 is the ball bearing, wherein the bearing has inner and outer races between which balls roll. The rolling-element bearing 20 could be designed for minimal axial and radial movement. The axial location and surface finish between the two races 22 and 24 could be tightly controlled. Replacing a standard actuator shaft bushing with a rolling-element bearing 20 may reduce friction and adverse movement.

Various seals may be feasible, such as a face seal 30 attached to the inner and/or outer race 22 and/or 24 that could seal against the opposing race 22 or 24.

The invention has been described in an illustrative manner, and it is to be understood that replacing a standard actuator shaft bushing with a rolling-element bearing 20 may not warrant patent protection, and this disclosure is a defensive publication replacing a standard actuator shaft bushing with a rolling-element bearing 20. BorgWarner and the inventor waive any right to receive a patent on the disclosure of the rolling-element bearing 20 replacing a standard actuator shaft bushing.

What is claimed is:

1. A variable turbine geometry turbocharger including an actuator pivot shaft bearing assembly with a rolling-element bearing with a cylindrical rolling element between an inner race and outer race and a face seal attached to the inner race and that seals against the outer race.

* * * * *